Figure 1:
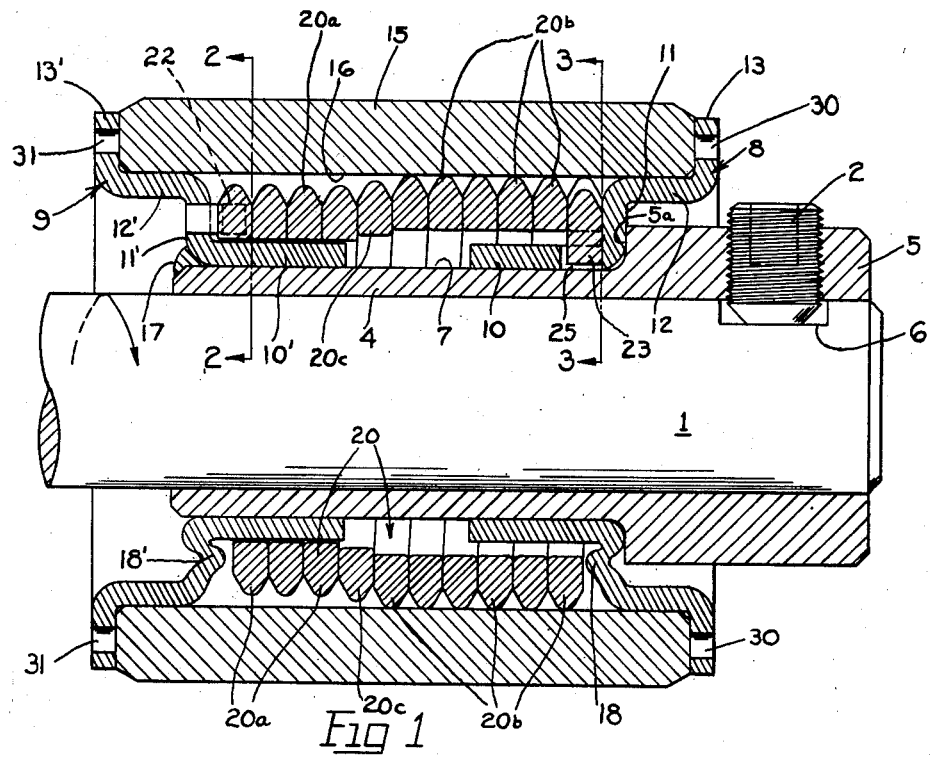

May 6, 1952     H. R. GREENLEE     2,595,454
TORQUE LIMITING CLUTCH MECHANISM

Filed Dec. 26, 1947

*INVENTOR.*
*HARRY R. GREENLEE*
BY
*George M. Soule*
ATTORNEY

Patented May 6, 1952

2,595,454

UNITED STATES PATENT OFFICE 2,595,454

TORQUE LIMITING CLUTCH MECHANISM

Harry R. Greenlee, Indianapolis, Ind., assignor, by mesne assignments, to The Marquette Metal Products Company, Cleveland, Ohio, a corporation of Ohio Application December 26, 1947, Serial No. 794,032

2 Claims. (Cl. 64—30)

The invention relates to an improvement in the construction and method of assembly of a torque limiting clutch unit, thus indicating the principal object.

Another object is to provide a spring clutch having provision for limiting the capability of the clutch spring to transmit to a power take-off element or driven member of the clutch more than a predetermined amount of torque, which clutch can be made from a very few economically fabricatable parts adapted to be easily assembled generally into operating relationship and then selectively adjusted and finally secured very simply in a manner to cause load rejection or clutch slippage at the particular maximum torque-transmitting value desired.

A further object is to provide a spring clutch construction which limits the torque transmissible from a driving to a driven member and either prevents free overrun or controls the overrunning action of the driven member.

Other objects and features of the invention will become apparent from the following description of the preferred forms shown in the drawing.

Figure 2:
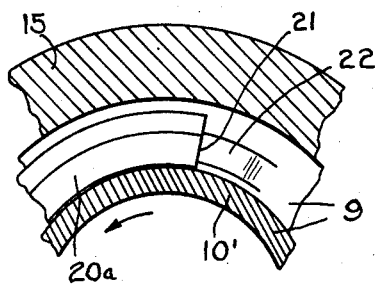
Figure 3:
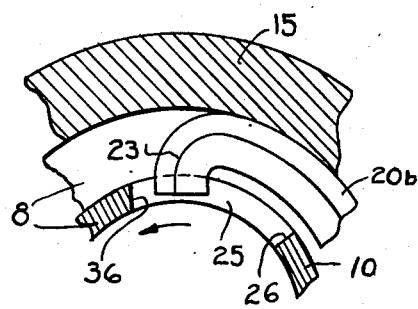
Figure 4:
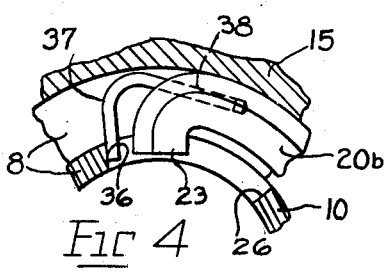

In the drawing, Fig. 1 is a central longitudinal sectional view showing the cooperating parts of the clutch in pre-selected relatively fixed operating position. Figs. 2 and 3 are fragmentary sectional views taken respectively along the lines 2—2 and 3—3 on Fig. 1. Fig. 4 is a view similar to Fig. 3 showing a modified arrangement for preventing free overrunning of the clutch.

The principle of operation of the torque limiting feature hereof is fully demonstrated by the co-pending application, W. C. Starkey, Serial No. 508,601, filed November 1, 1943, now patent 2,459,972. That principle of operation comprises provision of a clutch spring arranged to connect a driving and a driven member, a torque sensitive connection between clutching coils of the spring and one of said members enabling limited relative angular movement of the two members, and an unloading or spring de-energizing means cooperating with the spring consequent upon attainment of a predetermined degree of such relative angular movement to cause rejection of further loading by enabling relative slippage of the clutching surfaces. Such slippage then continues to take place until the imposed or resisting torque or load falls to the overload rejection point, whereupon the clutch again becomes effective to transmit power without slippage.

As shown herein, a torque-transmitting member 1 in the form of a shaft has secured thereto, as by set screw 2, a generally cylindrical mounting sleeve 4 having an enlarged diameter or head portion 5 through which the set screw extends for suitable contact with the shaft, as at the flattened surface 6 thereof. The head 5 provides a shoulder 5a adjacent the reduced diameter outer peripheral surface 7 of the mounting sleeve. The sleeve 4 on its smaller diameter surface portion 7 supports two substantially identical stepped diameter collars 8 and 9 having oppositely positioned neck portions 10 and 10', disc portions 11 and 11', rim or journal portions 12 and 12' and flange portions 13 and 13' respectively. The neck portions of the collars are in closely telescoping relation to the mounting sleeve surface 7, and the disc portions 11 and 11' support the flanged rims 12 and 12' in axially spaced concentric relation to the shaft 1 to provide a retaining and supporting journal for a tubular torque-transmitting drum 15 adapted to turn freely on the supporting rims 12 and 12' and be restrained from undesired axial movement by the collar flanges 13 and 13'. The sleeve 4 and the neck and disc portions 10, 11, etc. of the collars 8 and 9, together with the inner cylindrical smooth clutching surface 16 of the drum 15, define a pocket for a helical clutch spring generally indicated at 20.

Either the shaft 1 or drum 15 may be the driving member, hence either can be the driven member or power takeoff element of the clutch. The shaft 1, for purposes of this description, will be considered the driving member and its driving direction of rotation, in case the clutch spring is right hand wound as shown, is indicated by the arrow on the shaft in Fig. 1 or counter-clockwise as indicated by Figs. 2 and 3.

Each of the collars 8 and 9 can be die drawn from sheet metal or rolled from uniform thickness strip stock into approximately the section shown and the ends joined as by welding or may be die drawn or formed from uniform thickness metal tubing. The necessary special formations of the two collars (described later) are formed by suitable punching or lancing operations on identical collar blanks.

The neck portion 10 of the collar 8 is permanently secured as by welding, brazing or the like, to the mounting sleeve 4 with the disc portion 11 of the collar in abutment with the shoulder 5a of the mounting sleeve. The collar 9, after initial general assembly of the above described parts, is free to turn on the mounting sleeve for adjustment and setting of the overload rejection point of the clutch, as will be fully described later, and is finally secured in the desired adjusted or set position as by, for example, circumferentially spaced weld joints, one of which is indicated at 17 connecting the disc 11' to the left end portion of the mounting sleeve. Three equally spaced weld joints 17 are recommended.

To lend axial stability to the clutch spring, i. e. to prevent axial bodily movement of the spring out of place in its pocket, a set or series of dimples 18 and 18' of graduated height (one of each set shown) may be formed in respective disc portions 11 and 11' of the two collars 8 and 9. The dimples are of such height that all the dimples of each set would or could be slightly out of contact with adjacent portions of the respective end coils of the spring, thus approximately confining the spring to its illustrated position while allowing it to expand and contract in operation without restraint.

The clutch spring 20 has relatively large and small diameter coils at its opposite ends. The smaller coils 20a closely surround the neck portion 10' of the collar 9 although not in tight contact therewith; and the associated free end of the spring is positioned for abutment at 21, Fig. 2, with a lanced out projection or lug 22 of the disc portion 11' of said collar.

The larger diameter coils 20b of the clutch spring comprise the clutching coils; and at least one of those coils is formed or finished with its outer clutching surface somewhat larger than the coacting drum surface 16. All of the coils 20b are usually finished in such interference-fitting relation to the drum to maintain the spring in a self-energizing condition at all times. Between the sets of coils 20a and 20b one or more of the spring coils 20c is or are out of contact both with the drum surface 16 and the mounting sleeve and collar assembly. Since the coils 20a and 20c are free to expand as the shaft 1 is turned in the driving direction, all those coils may be considered torque sensitive coils.

The right hand terminal coil 20b has a radially extending, spring-unloading toe 23 thereon (Figs. 1 and 3) entering a circumferentially extending slot 25 punched into the neck portion 10 of the collar 8. The slot 25, to facilitate assembly of the clutch spring onto the collar 8, could have a portion (not illustrated) wide enough to receive the toe and extending axially of the collar to the left end of the neck portion 10.

Rotation of the drive shaft counter-clockwise as viewed in Fig. 2, through pressure of the lug 22 on the associated energizing end of the spring, tends to expand the clutching coils 20b, assuming the drum 15 and hence the opposite end of the spring are restrained, as by torque connection with a load, against free rotation. As shown in Fig. 3, the slot 25 is considerably longer than the circumferential dimensions of the toe 23 so that the rigid assembly comprising the shaft 1 mounting sleeve 4 and collar 9 can be angularly displaced in the driving direction by expanding the torque sensitive coil or coils 20a and/or 20c without so displacing the drum 15 although the coils 20b remain in tight clutching contact with the drum surface 21.

There is a specific advantage in so making the clutch that the torque sensitive coils expand radially under load rather than contract. As a coil spring is unwound from relaxed condition it can occupy less axial space. Therefore when the torque sensitive coils are expanded rather than contracted, there is no chance that axial wedging and mutual binding of the coils during the torque limiting operation will affect the overload rejection point. If the torque sensitive coils were contracted as the load rejection point is approached, then those coils, in case inadequate axial clearance were provided (as between the coils or in the total length of spring pocket space) would be rendered less sensitive to torque by the resulting friction pressure axially of the coils. The friction force would vary according to the lubricated or non-lubricated condition of the axially disposed coil faces.

In operation, while driving a load connected to the drum 15 up to a predetermined resisting torque the coils 20a and 20c are free to expand until the relative angular movement between the driving assembly (parts 1, 4, 8 and 9) and the driven drum 15 moves a shoulder 26 defining one end wall of the slot 25 (see Fig. 3) into contact with the toe 23 of the spring. When such contact has occurred, then further relative angular movement in the same direction results in a contraction of one or more of the coils 20b sufficient to allow slippage between the clutching coils of the spring and the drum surface 16. Since the slip or overload rejection point depends upon the amount of resisting torque necessary to expand the torque sensitive coil or coils 20a and/or 20c at least until abutment between the spring toe and shoulder 26 occurs, it follows that variation of the relationship of the abutment 21 and the shoulder 26 for engagement with the spring toe will vary the torque at which the device operates to reject further loading. An important feature of the present invention resides in the manner of relatively adjusting and securing of the parts which support the spring-controlling abutments 22 and 26 so that any desired overload rejection value within the capacity of the clutch can be precisely selected and maintained. Assembly of the parts is as follows:

The collar 8 is first secured as described to the mounting sleeve 4 and the clutch spring then placed around the sleeve 4, the toe 23 of the spring being slipped or sprung into the slot 25 of the collar 8, depending upon whether or not the slot is open to the left edge of the neck 10. The drum 15 is then forced over the larger diameter clutching coils 20b into final position against the flange 13 of the collar 8. Finally the collar 9 is slid into the position shown wherein the flange 13' of said collar lightly abuts the left hand end of the driven member 15.

For selection of the load rejection point the mounting sleeve 4 and the other parts assembled thereon may be mounted turnably on a stationary arbor occupying the mounting sleeve 4 in place of the shaft 1. As a preferred procedure the mounting sleeve sub-assembly unit 4, 8 is now connected to a torque measuring device such as an arm and an associated weighing mechanism (e. g. torque wrench, not shown) which may engage spanner holes 30 in collar flange 13. The wrench resists free turning of the mounting sleeve clockwise, Fig. 3. The drum 15 is then turned slowly in the direction opposite the indicated driving direction of the shaft 1, that is clockwise in Figs. 2 and 3, in order to maintain the toe 23 in contact with the shoulder 26 and to maintain the clutching surfaces of the spring and drum in running as against static friction contact.

The slowly rotating drum 15 through friction contact with the clutch spring coils 20b carries the spring toe 23 against the shoulder 26 thus causing the clutching coils 20b to slide in the drum 15, (overrunning action). The collar 9 which is still freely rotatable on the sleeve 4 is then turned as by a spanner wrench engaging suitable openings 31 in the flange 13' in a direction to force the toe 22 of said collar against the spring at 21, or, in other words, in the direction indicated by the arrow on the driving shaft (counter-clockwise Fig. 2). A spring de-energizing pressure of the shoulder 26 on the spring toe 23 is maintained by the rotating drum, thus preventing the counter-clockwise energizing pressure of the lug 22 on the opposite end of the spring from locking the load carrying spring coils 20b in the drum. The torque sensitive coils 20a and/or 20c now uncoil and expand in proportion to the torque exerted by the spanner wrench on the collar 9 and that in turn increases the relatively overrunning friction pressure of the coils 20b on the drum thus maintaining the toe 23 in contact with the shoulder 26 with increasing force. The increased pressure of the spring toe clockwise on the shoulder 26 of the collar 8 is indicated by the torque wrench connected to said collar. When the indicated torque reaches the point at which it is desired that the clutch shall slip and reject further loading then the weld joints 17 are made as with a welding torch or electrode.

When the torsional strain in the torque sensitive coil or coils is removed, as when all torque is removed from the drum 15 and the other parts, the spring toe moves in the slot 25 through whatever angle the torque sensitive coils of the spring were torsionally strained in determining the proper angular relationship of the lug 22 and shoulder 26 as described.

A variation of the above described method of setting the clutch for a predetermined overload rejection value and which could be used in commercial production (assuming the parts are generally assembled as already indicated) comprises: fixedly holding the mounting sleeve and collar assembly 4, 8 against turning; slowly rotating the drum clockwise (Fig. 3) to maintain the spring toe 23 against the shoulder 26; turning the collar 9 counter-clockwise (Fig. 2) by means of a torque wrench or its equivalent until it registers the desired torque limiting value and then securing the collar 9 onto the mounting sleeve 4.

If, instead of turning the drum 15 slowly as in the two variations of the method described above and weighing the torque on one of the collars 8 or 9, the drum, mounting sleeve assembly and clutch spring were held against rotation (toe 23 first placed in contact with shoulder 26), and the collar 9 were then turned to strain the torque sensitive coils 20a and/or 20c to a desired torque value before effecting the welding at 17, the clutch would then be set to slip or reject overloading at approximately the torque required to strain said coils. However, since the coils 20b are preloaded against the drum surface 16 and, during the torque limiting operations, a certain amount of de-clutching of those coils is necessary in order to offset the torque capacity of such preloading the clutch would slip at a torque value an indeterminate amount in excess of such torque strain on the torque sensitive coils.

Also, if instead of turning the drum slowly as in the preferred procedure, the drum 15 were to be held against turning; the collar 9 were to be turned as by a torque wrench in the direction first to expand the spring coils 20b against the drum and then until the torque wrench indicated the desired load rejection value, and, finally, the collar 8 were to be turned by another wrench until the shoulder 26 released the coils 20b from clutching contact with the drum, there would, in such case, be no effective manner in commercial production of maintaining the two wrenches in the angular relationship determinative of the slipping point of the clutch while performing the welding at 17.

Instead of permitting the clutch spring to become fully relaxed after setting the overload rejection point it is practicable to retain a small percentage of the torque strain in the clutch spring in the fixed relative position of the collars 8 and 9. The clutch will not then have a free overrunning action because, for example, when the drum attempts to overrun the drive shaft the end coil of the spring adjacent the toe 23 would become an energizer coil and progressively build up clutching pressure in the various coils 20b from right to left, Fig. 1. If a production lot of clutches according to the present disclosure are always to have approximately the same torque limit setting the slot 25 may have such predetermined circumferential length that the toe, in the relaxed or nearly relaxed condition of the spring, will make like contact with the shoulder 36 defining the end of the slot 25 opposite the shoulder 26. Preferably, however, in order to prevent free overrun when that is desired, a light spring 37, Fig. 4, is secured to the end of the clutch spring having the unloading toe 23. The spring 37, as shown, has one end inserted in a tangential bore 38 in the clutch spring end portion so that the free end of the spring 37 makes continual yielding contact with the shoulder 36 as illustrated when the parts are secured together as already explained.

I claim:

1. A torque-limiting clutch comprising two concentric rotary members, a helical clutch spring having clutching coils in friction contact with a drum surface of one of the members, a torque sensitive, spring coil deflecting connection between one end of the spring and the other member, a spring de-energizing connection between the opposite end of the spring and said other member, operative to deflect one or more of the clutching coils radially away from the drum and thereby cause the clutching coils to slip on the drum consequent upon imposition of a predetermined torque strain on the torque sensitive connection, said de-energizing connection comprising an abutment member on said opposite end of the spring positioned for engagement by one of a pair of circumferentially spaced shoulders on said other rotary member to cause such slippage, and a yielding normally continually strained connection between said opposite end of the clutch spring and the other shoulder to prevent free overrunning of the clutch.

2. A torque-limiting clutch comprising: a torque-transmitting member, two collars in telescoping relation thereto, having, respectively, a neck portion, relatively enlarged diameter portion and a contiguous flange portion, said portions being positioned oppositely of each other, a torque-transmitting drum surrounding said member and the collars, journalled for rotation on the enlarged diameter portions of the collars and restrained against axial movement by the flange portions thereof, a clutch spring surrounding the neck portions of the collars, the spring having clutching coils at one end normally in frictional contact with the drum and torque sensitive coils at the other end radially spaced from the drum, one of the collars having a torque-transmitting connection with the torsion-coil-containing end of the spring operative to maintain the clutching coils expanded against the drum during normal load drive and the other collar having a spring-deenergizing, coil contracting connection with a terminal one of the clutching coils operative in an angularly displaced relative position of said torque-transmitting member and drum to limit the torque transmissible by the clutch.

HARRY R. GREENLEE.

REFERENCES CITED

The following references are of record in the file of this patent:

UNITED STATES PATENTS

| Number | Name | Date |
|---|---|---|
| 1,126,780 | Jones | Feb. 2, 1915 |
| 1,561,537 | Hayes | Nov. 17, 1925 |
| 2,360,187 | Almen | Oct. 10, 1944 |
| 2,459,972 | Starkey | Jan. 25, 1949 |

FOREIGN PATENTS

| Number | Country | Date |
|---|---|---|
| 168,195 | Germany | Mar. 6, 1906 |
| 601,970 | Germany | 1934 |